United States Patent [19]

Shoda

[11] 4,137,177
[45] Jan. 30, 1979

[54] FILTERING APPARATUS FOR SLUDGY LIQUIDS

[75] Inventor: Yoshikazu Shoda, Tokyo, Japan

[73] Assignee: Nishihara Environmental Sanitation Research Corporation Limited, Tokyo, Japan; a part interest

[21] Appl. No.: 700,904

[22] Filed: Jun. 29, 1976

[30] Foreign Application Priority Data

Jul. 4, 1975 [JP] Japan ............................ 50-93495[U]
Jul. 4, 1975 [JP] Japan ............................ 50-93496[U]
Jul. 4, 1975 [JP] Japan ............................ 50-93497[U]
Jul. 4, 1975 [JP] Japan ............................ 50-82467

[51] Int. Cl.$^2$ .......................................... B01D 33/10
[52] U.S. Cl. .................................... 210/403; 210/393
[58] Field of Search ................ 210/402, 403, 394, 393

[56] References Cited

U.S. PATENT DOCUMENTS

| | | | |
|---|---|---|---|
| 2,450,522 | 10/1948 | North | 210/403 X |
| 2,758,722 | 8/1956 | Murray | 210/403 X |
| 2,891,671 | 6/1959 | Nilsson | 210/403 X |
| 2,987,191 | 6/1961 | Wennberg | 210/402 X |
| 3,941,702 | 3/1976 | Kawada | 210/403 X |
| 3,979,289 | 9/1976 | Byowski et al. | 210/403 X |

FOREIGN PATENT DOCUMENTS 903353   8/1962   United Kingdom.

Primary Examiner—Morris O. Wolk
Assistant Examiner—Arnold Turk
Attorney, Agent, or Firm—Bucknam and Archer

[57] ABSTRACT

Filtering apparatus comprising a stationary housing and a rotary filter drum having a peripheral filter screen with elongated filter openings extending parallel to an axis thereof and disposed within the housing to define a space between the filter drum and the housing. A sludgy liquid supply means is provided for supplying the sludgy liquid from the inside of the filter drum onto the inner surface of the filter screen. Solid component adheres to the filter screen and liquid component passes through the elongated filter openings of the filter screen into the space, said solid component on the filter screen being discharged from the interior of the filter drum through the housing in the form of aggregations of filtration residue and said liquid component being discharged from the space through an outlet opening as filtrate.

1 Claim, 5 Drawing Figures

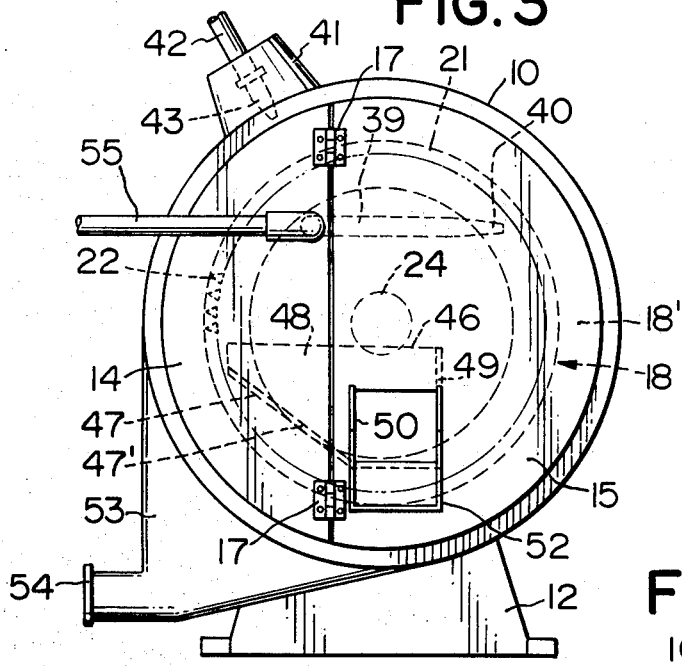
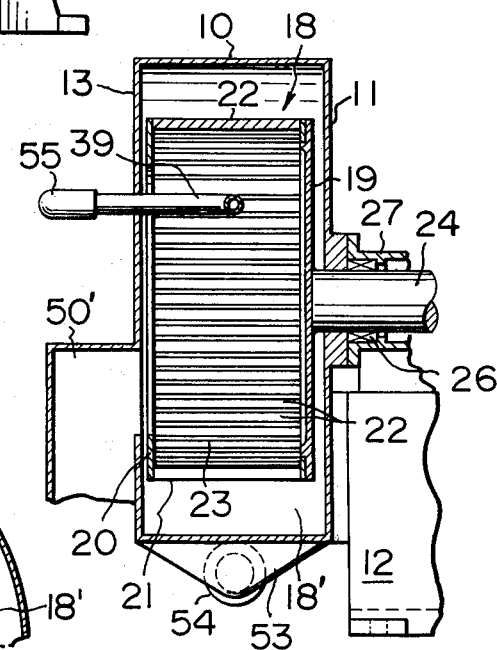
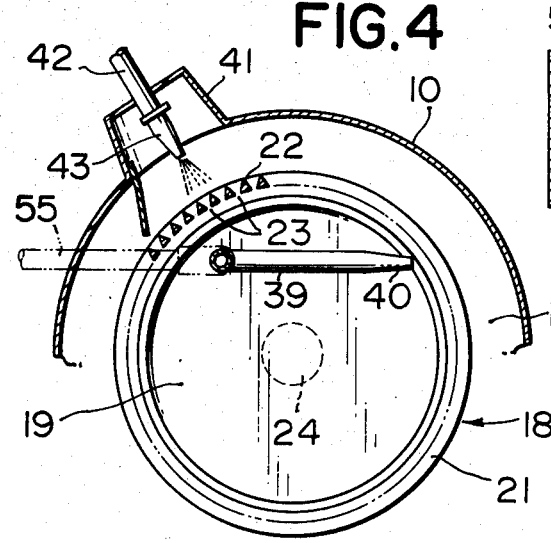

FILTERING APPARATUS FOR SLUDGY LIQUIDS

This invention relates to a filtering apparatus adapted for filtration of sludgy liquids such as night soil, sewage or the like.

A main object of the invention is to provide a filtering apparatus of a type in which there is a rotary filter drum having a filter screen on the periphery thereof and sludgy liquid is continuously supplied from the inside of the filter drum onto the filter screen to separate the sludgy liquid into solid and liquid components.

Another object of the invention is to provide a filtering apparatus which makes it possible to minimize clogging of the filter screen by solids and in which solid filtration residue adhered onto the inner surface of the filter screen is removed in the form of aggregations thereof through the filter drum.

According to the invention, there is provided a filtering apparatus comprising a stationary housing and a rotary filter drum having a peripheral filter screen with elongated filter openings extending parallel to an axis thereof and disposed within the housing to define a space between the filter drum and the housing.

A sludgy liquid supply means is provided for supplying the sludgy liquid from the inside of the filter drum onto the inner surface of the filter screen. Solid component adheres to the filter screen and liquid component passes through the elongated filter openings of the filter screen into the space, said solid component on the filter screen being discharged from the interior of the filter drum through the housing in the form of aggregations of filtration residue and said liquid component being discharged from the space through an outlet opening as filtrate.

According to the invention, more particularly, there is provided a filtering apparatus for sludgy liquid comprising a stationary housing having a front wall and a rear end wall, a filter drum having at its front end an opening and a peripheral filter screen with elongated filter openings extending parallel to the axis thereof, and disposed within the housing to define a space between the housing and the filter drum, means for rotating said filter drum, sludgy liquid supply pipe extending into the interior of the filter drum and terminating in an opening means for spraying the sludge liquid onto the inner surface of the filter screen of the rotating filter drum of separate the sludgy liquid into solid and liquid components, said solid component adhering to the inner surface of the filter screen as filtration residue and said liquid component passing through the elongated filter openings of the filter screen into said space as filtrate, means for discharging aggregations of filtration residue formed on the inner surface of the filter screen during the continuous rotation of the filter drum, and an outlet opening for discharging the filtrate in the space to the exterior of the housing.

In a preferred embodiment of the invention, the filter drum includes a rear end wall and a front annular ring defining said opening thereof, and the filter screen of the filter drum includes a series of closely spaced filter bars extending parallel to the axis of the filter drum to define the elongated filter opening between the two adjacent bars, each of the bars being of a triangular shape in cross-section with its apex directed outwards and being secured at one end to the rear end wall and at the other end to the front annular ring.

The filtering apparatus includes a washing water supply pipe extending through the housing into the space between the housing and the filter drum and having a nozzle for spraying washing water onto the outer surface of the filter screen to clean it.

Other objects and advantages of the invention will become apparent from the following description made with reference to the accompanying drawings which are given by way of example.

In the drawings,

FIG. 3 is a front elevational view of the filtering apparatus;

FIG. 4 is a cross-sectional view of the filtering apparatus showing in detail an arrangement of a housing, a filter screen of a filter drum, and a washing water nozzle; and FIG. 5 is a cross-sectional view showing another embodiment of the invention.

Figure 1:
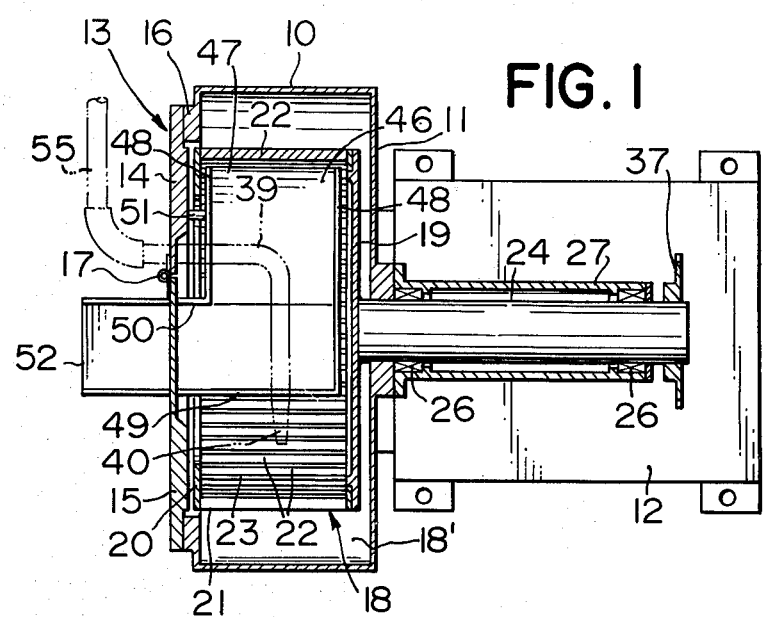
FIG. 1 is a top plan view of a filtering apparatus according to the invention with a portion thereof shown in cross-section.
Figure 2:
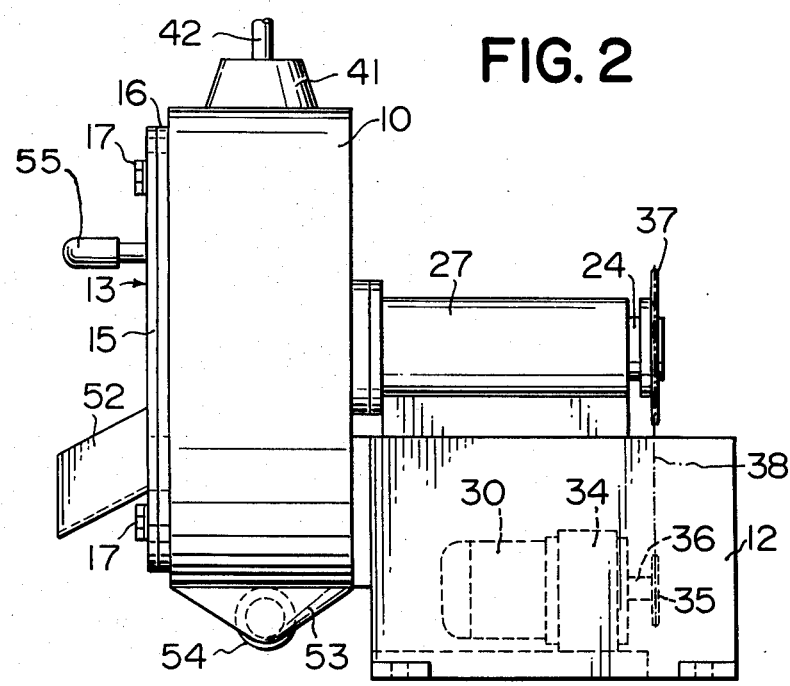
FIG. 2 is a side elevatinal view of the filtering apparatus of FIG. 1.

Referring to FIGS. 1 and 2 of the drawings, a filtering apparatus comprises a stationary cylindrical housing 10 having a rear end wall 11 and fixed to a base frame 12. A front end plate 13 forming a front wall is divided into two semicircular halves 14 and 15, one of them being secured to an annular flange 16 extending inwardly from the front edge of the cylindrical housing 10 and the other half 15 being pivotally connected to the vertical edge of the semicircular half 14 by means of hinges 17 to provide a lid for the housing 10.

A filter drum 18 is located concentrically with the housing 10 to define an annular space 18 for filtrate between the drum and the housing and comprises a circular rear end plate 19, an annular front support ring 20 spaced apart from the end plate 19 and a cylindrical filter screen 21 supported on the end plate 19 and the ring 20. As shown in FIG. 4 of the drawings, the cylindrical filter screen 21 includes a series of closely spaced filter bars 22, each of which is of a triangular shape in cross-section with its apex directed outwards and extends parallel to an axis of the filter drum 18. Each bar 22 is secured at its one end to the circular rear end plate 19 and at the other end to the annular front support ring 20 and the two adjacent filter bars 22 forms an elongated filter opening 23 extending parallel with the axis of the filter drum 18.

A shaft 24 which extends through the rear end wall 11 of the housing 10 is fixedly connected at its inner end to the circular rear end plate 19 of the filter drum in alignment with the axis of the filter drum 18 and is rotatably supported in bearings 26 which are located in a bearing housing 27 fixed on the base frame 12.

A motor 30 with a reduction gear 34 is housed in the base frame 12 and a sprocket 35 is secured to an output shaft 36 of the reduction gear 34. A sprocket 37 is secured to the outer end of the shaft 24 and operatively connected to the sprocket 35 by means of a chain 38 to transmit rotation of the motor 33 through the reduction gear 34 to the shaft 24, thereby to rotate the filter drum 18 within the outer housing 10 at any desired speed.

A sludgy liquid supply pipe 39 extends from the exterior of the housing 10 through the upper portion of the half 14 of the front end plate 13 into the filter drum 18 and is firmly secured to the plate half 14. An extension of the sludgy liquid supply pipe 39 into the filter drum 18 is directed toward the filter screen 21 in the upper position of the filter drum 18 and terminates in an opening means 40 positioned adjacent the inner surface of the filter screen 21.

The cylindrical housing 10 is formed on its upper portion with an outwardly projecting portion 41 to which a washing water supply pipe 42 is attached. Secured to the inner end of the washing water supply pipe 42 is a nozzle 43 for spraying the washing water onto the outer surface of the filter screen 21 of the filter drum to clean the filter screen 21.

A discharge means includes a collector 46 provided within the filter drum 18 for collecting filtration residue which is adhered onto the inner surface of the filter screen by filtration of sludgy liquid from the opening means 40 through the filter openings 23 of the filter screen and including a bottom 47 having a downwardly inclined portion 47', a pair of opposed front and rear walls 48, a side wall 49 and a discharge shoot 50 extending forwards from the front wall 48 and communicating with the interior of the collector 46. Preferably, the collector 46 is so arranged that the upper end of the inclined wall portion 47' of the collector 46 is suitably spaced from the inner surface of the filter screen and positioned in the range of angles of 220° to 250° in the clockwise direction from a vertical plane extending upwardly from the axis of the housing 10. The collector 46 is also supported from the front wall half 14 by means of connecting rods 51 extending through the opening of the annular front support ring 20 on the filter drum 18.

The lid is provided with an outlet shoot 52 which is adapted to communicate with the discharge shoot 50 of the collector when the lid is in the closed position. The housing 10 is provided with filtrate collector 53 terminating in an outlet opening 54 and communicating with the annular space 18' between the housing 10 and the filter drum 18.

In an embodiment shown in FIG. 5, only a discharge shoot 50' is provided for removing aggregations of filtration residue directly from the interior of the filter drum.

In operation, rotation of the motor 30 is transmitted through the reduction gear 34, sprockets 35, 37 and the chain 38 to the shaft 24 to rotate the filter drum 18 in the clockwise direction. Preferably, the filter drum 18 is rotated at 10 – 35 r.p.m. Sludgy liquid to be treated such as sewage or night soil dipped up from houses in cities incontinuously supplied from a source of sludgy liquid through a pipe 55 and through the opening 40 of the supply pipe 39 onto a downwardly moving portion of the inner surface of the filter screen 21 of the rotating filter drum 18 so that the majority of solid portions contained in the sludgy liquid adheres to the inner surface of the screen 21 to form filtration residue while the liquid portion passes through the elongated filter openings 23 of the filter screen 21 into the annular space 18' as filtrate. The filtrate in the annular space 18' flows toward the collector 53 and then, is discharged through the outlet opening 54. The filtration residue is sufficiently dehydrated while it is carried together with the filter drum 18 by its rotation. The dehydrated filtration residue is separated from the inner surface of the filter screen 21 by adhering to aggregations of filtration residue which have been formed previously. The aggregations also adhere to each other by rolling over the filtration residue which is carried by the inner surface of the filter screen 21 to form larger aggregations. It will be noted that the rolling action of the aggregations facilitates the separation of the filtration residue from the inner surface of the filter screen whereby clogging of the filter openings by solids is prevented. Thus, the aggregations of filtration residue carried upwardly along the inner surface of the screen by the rotating filter drum 18 fall into the collector 46 so that they can be discharged through the discharge shoot 50 and the outlet shoot 52 to the outerior of the machine. In the embodiment shown in FIG. 5, the aggregations of filtration residue are discharged directly from the interior of the filter drum through the discharge shoot 50'.

Upon completion of the filtration, washing water from the supply pipe 42 is sprayed through the nozzle 43 onto the outer surface of the filter screen 21 to clean the filter openings of the filter screen 21 while rotating the filter drum 18. The dirty water which has passed through the filter openings can pass again from the interior of the drum 18 through the filter openings into the annular space so that it is discharged therefrom through the outlet opening to the outerior of the machine.

It will be noted from the foregoing that there is provided an apparatus which is capable of continuously filtering nightsoil, sewage or any other sludgy liquids in such a manner that solids in the liquid are continuously removed in the form of their aggregations and in which the filter openings of the filter screen do not become clogged by solids due to the fact that the sludgy liquid is supplied onto the filter screen and the filtration residue is positively separated from the filter screen during rotation of the filter drum.

I claim:

1. A filtering apparatus for sludgy liquid comprising a stationary housing having a front wall and a rear end wall, a filter drum disposed within the housing and having an annular ring defining a front opening adjacent said front wall and a rear end plate and a peripheral filter consisting of a series of closely spaced filter bars extending parallel to the central longitudinal axis of the filter drum between said annular ring and said end plate to define elongated filter openings between the adjacent bars, said filter drum defining an annular space between the housing and the filter drum, means for rotating said filter drum, sludgy liquid supply means extending into the interior of the filter drum for supplying the sludgy liquid onto the inner surface of the filter of the rotating filter drum to separate the sludgy liquid into a solid component and a liquid component and to a deposit the solid component onto said filter, means for discharging filtration residue of the solid component from the interior of the filter drum and means for discharging the liquid component passing through the elongated filter openings through said annular space to the exterior of the housing, said sludgy liquid supply means including a pipe extending horizontally through the front opening of the filter drum towards the inner surface of the filter of the filter drum at an intermediate position between the central longitudinal drum axis and the top of the drum and having opening means for spraying the sludgy liquid onto a downwardly moving portion of the filter to effect the separation of the sludgy liquid into a solid component and a liquid component, said solid component carried by the portion of the filter being separated from it by adhering to aggregations of filtration residue rolling on a bottom portion of the filter drum due to the rotation of the drum, said aggregations of filtration residue which have accumulated on the inner surface of the filter screen being progressively discharged through said discharging means.

* * * * *